United States Patent
Anan (10) Patent No.: US 9,670,017 B2
(45) Date of Patent: Jun. 6, 2017

(54) MOTOR CONTROLLER, SHEET CONVEYING DEVICE, AND IMAGE FORMING APPARATUS

(71) Applicant: KYOCERA Document Solutions Inc., Osaka-shi, Osaka (JP)

(72) Inventor: Naohiro Anan, Osaka (JP)

(73) Assignee: KYOCERA Document Solutions Inc., Osaka-shi, Osaka (JP)

(*) Notice: Subject to any disclaimer, the term of this patent is extended or adjusted under 35 U.S.C. 154(b) by 0 days.

(21) Appl. No.: 15/046,376

(22) Filed: Feb. 17, 2016

(65) Prior Publication Data
US 2016/0248366 A1    Aug. 25, 2016

(30) Foreign Application Priority Data
Feb. 20, 2015    (JP) .................. 2015-032049

(51) Int. Cl.
| | | |
|---|---|---|
| B65H 5/34 | (2006.01) | |
| B65H 5/06 | (2006.01) | |
| H02P 6/06 | (2006.01) | |
| H02P 29/032 | (2016.01) | |
| B65H 7/14 | (2006.01) | |

(52) U.S. Cl.
CPC ............. *B65H 5/06* (2013.01); *B65H 5/062* (2013.01); *B65H 7/14* (2013.01); *H02P 6/06* (2013.01); *H02P 29/032* (2016.02); *B65H 2403/92* (2013.01); *B65H 2511/33* (2013.01); *B65H 2513/11* (2013.01); *B65H 2515/704* (2013.01); *B65H 2557/262* (2013.01)

(58) Field of Classification Search
CPC .. B41J 11/42; B41J 29/38; B65H 7/12; B65H 7/20; B65H 2513/10; B65H 29/68; B65H 5/34; B65H 2513/512; B65H 2553/00; B65H 7/14; G05B 2219/42289
USPC ................ 271/270, 258.01, 265.01; 318/635
See application file for complete search history.

(56) References Cited

U.S. PATENT DOCUMENTS

| | | | |
|---|---|---|---|
| 8,833,894 B2* | 9/2014 | Iesaki | B41J 29/38 347/16 |
| 2012/0081062 A1* | 4/2012 | Iesaki | G05B 13/024 318/596 |

(Continued)

FOREIGN PATENT DOCUMENTS

| | | |
|---|---|---|
| JP | H02070280 A | 9/1990 |
| JP | H02273268 A | 11/1990 |

(Continued)

*Primary Examiner* — Thomas Morrison
(74) *Attorney, Agent, or Firm* — Alleman Hall Creasman & Tuttle LLP (57) ABSTRACT

A motor controller includes a drive control portion. The drive control portion is configured to: execute feedback control of a drive current to be supplied to a drive motor, by using an inputted control signal indicating a target rotation speed for the drive motor and a detection signal of a rotation speed detection portion configured to detect a rotation speed of the drive motor; control the drive current in a first control period in which the target rotation speed is changed, such that the drive current is equal to or less than a predetermined first upper limit; and control the drive current in a second control period in which the target rotation speed is constant, such that the drive current is equal to or less than a predetermined second upper limit less than the first upper limit.

3 Claims, 4 Drawing Sheets

(56) References Cited

U.S. PATENT DOCUMENTS

2012/0326387 A1* 12/2012 Ishizaki ................ B65H 9/006
271/270
2013/0070014 A1* 3/2013 Iesaki ..................... B41J 29/38
347/16

FOREIGN PATENT DOCUMENTS

| JP | 2002002039 A | 1/2002 |
| JP | 2012000888 A | 1/2012 |
| JP | 2012029457 A | 2/2012 |
| JP | 2013162684 A | 8/2013 |
| JP | 2015031890 A | 2/2015 |

\* cited by examiner

MOTOR CONTROLLER, SHEET CONVEYING DEVICE, AND IMAGE FORMING APPARATUS

INCORPORATION BY REFERENCE

This application is based upon and claims the benefit of priority from the corresponding Japanese Patent Application No. 2015-032049 filed on Feb. 20, 2015, the entire contents of which are incorporated herein by reference.

BACKGROUND

The present disclosure relates to a motor controller which controls a drive motor, a sheet conveying device including the motor controller, and an image forming apparatus including the sheet conveying device.

Conventionally, an image forming apparatus, such as a copying machine, a printer, and a facsimile which each include an image forming portion, and a multifunction peripheral equipped with respective functions of them, is provided with a plurality of rollers for conveying a sheet on which an image is to be formed. These rollers are driven by a drive motor. As the drive motor which drives the rollers, a servomotor such as a DC brushless motor may be used.

In the case where the servomotor is used as the drive motor, a detector such as a rotary encoder which detects a rotation speed of each roller is normally provided. The motor is supplied with a drive current generated by a PWM method (pulse width modulation method) on the basis of a control signal which commands a rotation condition for the motor which is obtained on the basis of an output signal of the detector. Accordingly, feedback control of a rotation speed of the drive motor is performed.

Incidentally, if a large load is continuously applied to the drive motor, it is possible to perform speed control of the subject to be driven by the drive motor, by increasing a duty of the PWM signal in a range of up to a maximum current (rated load current) that can be supplied to the drive motor. However, when the maximum current is supplied to the drive motor, an amount of heat generated by the drive motor considerably increases, so that the service life of the drive motor may be shortened or the drive motor may be broken.

Meanwhile, if a state where the duty of the PWM signal generated through the feedback control exceeds a predetermined duty continues during a predetermined time, the drive motor may be stopped. In this configuration, if a large load applied to the drive motor is intermittent, the PWM signal having a duty exceeding the predetermined duty is intermittently outputted to the drive motor during the time when the large load is applied to the drive motor. Also in this case, an amount of heat generated by the drive motor can considerably increase. However, in the above configuration in which the drive motor is stopped if the state where the duty of the PWM signal exceeds the predetermined duty continues during the predetermined time, the drive motor is not stopped and continues to operate. Therefore, breakage of the drive motor due to an increase in the amount of heat generated by the drive motor still can occur.

SUMMARY

A motor controller according to one aspect of the present disclosure includes a drive control portion. The drive control portion is configured to: execute feedback control of a drive current to be supplied to a drive motor, by using an inputted control signal indicating a target rotation speed for the drive motor and a detection signal of a rotation speed detection portion configured to detect a rotation speed of the drive motor; control the drive current in a first control period in which the target rotation speed is changed, such that the drive current is equal to or less than a predetermined first upper limit; and control the drive current in a second control period in which the target rotation speed is constant, such that the drive current is equal to or less than a predetermined second upper limit less than the first upper limit.

A sheet conveying device according to another aspect of the present disclosure includes the motor controller and a conveying roller. The conveying roller is configured to rotate by using a driving force transmitted from the drive motor controlled by the motor controller, to convey a sheet member.

An image forming apparatus according to still another aspect of the present disclosure includes the sheet conveying device and an image forming portion. The image forming portion is configured to form an image on the sheet member conveyed by the sheet conveying device.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of the present disclosure will be described with reference to the drawings. The embodiment described below is merely an example embodying the present disclosure, and the embodiment of the present disclosure may be appropriately modified without departing from the gist of the present disclosure.

Figure 1:
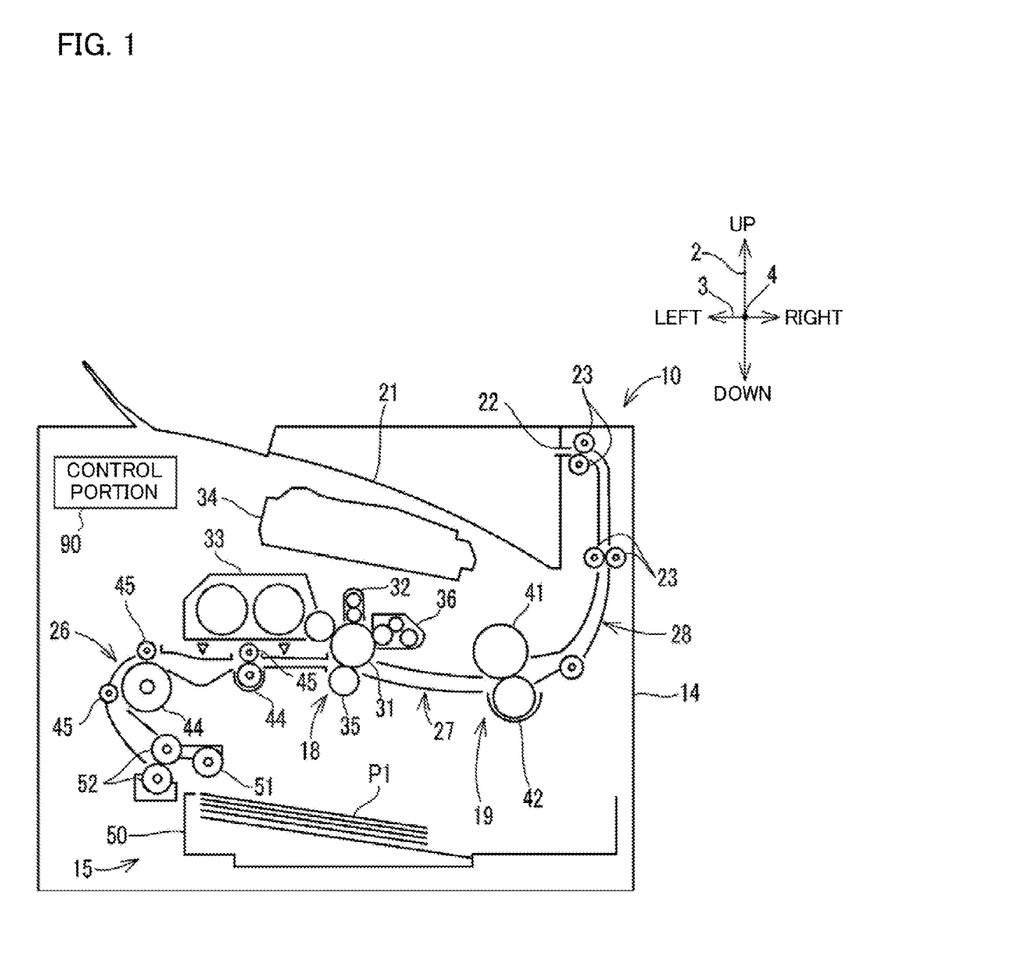
FIG. 1 is a diagram showing the configuration of an image forming apparatus according to an embodiment of the present disclosure.

FIG. 1 is a diagram showing the configuration of an image forming apparatus 10 according to an embodiment of the present disclosure. In the following description, an up-down direction 2, a right-left direction 3, and a front-rear direction 4 which are defined in FIG. 1 are sometimes used.

As shown in FIG. 1, the image forming apparatus 10 is a printer which prints an inputted image on a sheet member P1 by using toner. The image forming apparatus 10 is not limited to the printer having only a print function. The present disclosure is applicable to, for example, even a facsimile, a copying machine, or a multifunction peripheral equipped with the respective functions of the printer, the copying machine, the facsimile, and the like.

The image forming apparatus 10 prints an image on the sheet member P1 on the basis of image data inputted externally via a network communication portion which is not shown. The image forming apparatus 10 includes a sheet feed portion 15, an image forming portion 18, a fixing portion 19, a sheet discharge portion 21, a control portion 90, and a sheet conveying device 100 (see FIG. 2).

The sheet feed portion 15 includes a paper feed tray 50, a pick-up roller 51, and a sheet feed roller pair 52. In the paper feed tray 50, sheet members P1 on which an image is to be formed by the image forming portion 18 are stored. When an instruction for starting an operation of feeding the sheet member P1 is inputted to the image forming apparatus 10, the sheet member P1 is fed from the paper feed tray 50 by the pick-up roller 51 and the sheet feed roller pair 52. The sheet member P1 fed by the pick-up roller 51 is conveyed by the sheet feed roller pair 52 to a first conveyance path 26 formed at the downstream side in the direction in which the sheet member P1 is fed.

The first conveyance path 26 is a conveyance path formed from the sheet feed roller pair 52 to the image forming portion 18, and is formed by conveyance guides (not shown) provided so as to be opposed to each other. A plurality of rotary rollers 44 are disposed on the first conveyance path 26. At the respective rotary rollers 44, rotary rollers 45 are disposed in a state of being in contact with the outer circumferential surfaces of the rotary rollers 44. When the rotary rollers 44 rotate, the rotary rollers 45 also rotate so as to follow this rotation. The sheet member P1 fed to the first conveyance path 26 by the sheet feed roller pair 52 is conveyed to the image forming portion 18 while being nipped between each rotary roller 44 and each rotary roller 45.

The image forming portion 18 is provided near the end of the first conveyance path 26. The image forming portion 18 is an electrophotographic type image forming portion which forms a toner image on the sheet member P1 on the basis of externally inputted image data. The image forming portion 18 includes a photosensitive drum 31, a charging portion 32, a developing portion 33, an exposure portion 34, a transfer portion 35, and a cleaning portion 36.

When an image forming operation is started, the surface of the photosensitive drum 31 is charged at a uniform potential by the charging portion 32. In addition, the exposure portion 34 scans the charged photosensitive drum 31 with laser light in accordance with the image data. Accordingly, an electrostatic latent image is formed on the photosensitive drum 31. Thereafter, toner is attached to the electrostatic latent image by the developing portion 33, whereby a toner image is developed on the photosensitive drum 31. Then, the toner image is transferred by the transfer portion 35 onto the sheet member P1 that has been conveyed on the first conveyance path 26. The sheet member P1 on which the toner image has been formed is conveyed to a second conveyance path 27 formed at the downstream side with respect to the image forming portion 18 in the direction in which the sheet member P1 is conveyed.

The sheet member P1 sent out from the image forming portion 18 to the second conveyance path 27 is conveyed through the second conveyance path 27 to the fixing portion 19. The fixing portion 19 fixes the toner image transferred onto the sheet member P1, on the sheet member P1 by heat and pressure. The fixing portion 19 includes a heating roller 41 and a pressure roller 42. At the fixing portion 19, the toner is heated and melted by the heating roller 41 to be fixed on the sheet member P1. The sheet member P1 on which the image has been fixed by the fixing portion 19 is conveyed to a third conveyance path 28 formed at the downstream side with respect to the fixing portion 19 in the direction in which the sheet member P1 is conveyed.

On the third conveyance path 28, a plurality of sheet discharging roller pairs 23 are provided. The sheet member P1 sent out to the third conveyance path 28 is conveyed upward through the third conveyance path 28 by the sheet discharging roller pairs 23, and is discharged through a paper sheet discharge port 22 to the sheet discharge portion 21 provided at an upper surface of the image forming apparatus 10.

As described above, the pick-up roller 51, the sheet feed roller pair 52, the rotary rollers 44, the heating roller 41, the pressure roller 42, and the sheet discharging roller pairs 23 rotate thereby to convey the sheet member P1. In the following desorption, these rollers are collectively referred to as conveying roller 150 (see FIG. 2).

Figure 2:
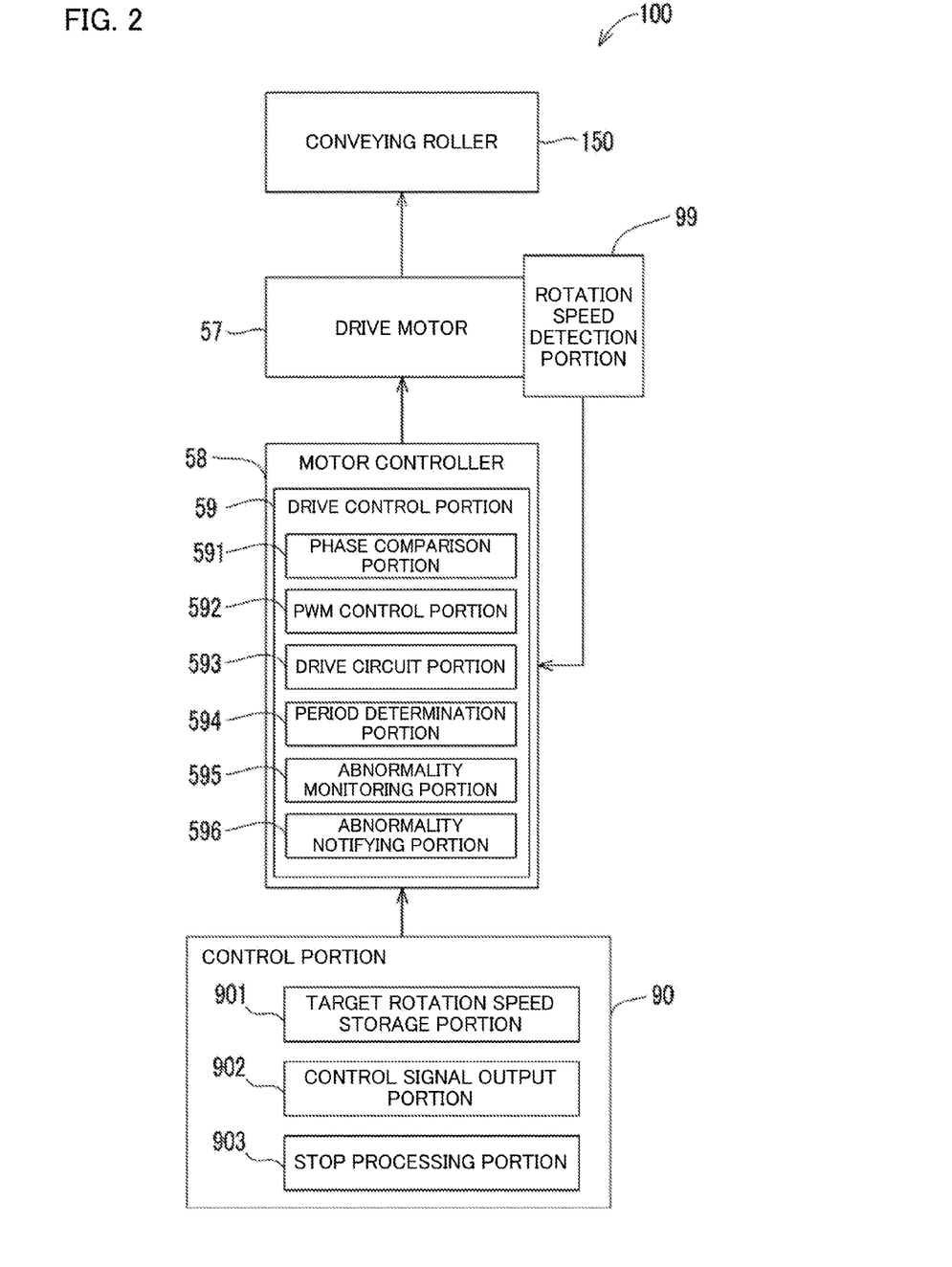
FIG. 2 is a block diagram showing the configuration of a sheet conveying device provided in the image forming apparatus according to the embodiment of the present disclosure.

As shown in FIG. 2, the conveying roller 150 is rotationally driven by a driving force generated by a drive motor 57 and transmitted via a drive transmission mechanism, such as a gear, which is not shown. The drive motor 57 is a servomotor such as a DC brushless motor. In the present embodiment, as the drive motor 57, an inner rotor type DC brushless motor is used in which a plurality of electromagnets are provided in a yoke and a rotor connected to a motor output shaft 48 (see FIG. 3) is provided inside the yoke. In addition, in the drive motor 57, when three-phase drive currents having different phases are supplied to the electromagnets, the rotor is rotated, and the conveying roller 150 is rotated via the motor output shaft 48 connected to the rotor. The drive motor 57 is not limited to the DC brushless motor as long as the drive motor 57 is a servomotor of which feedback control of a rotation speed or the like is performed on the basis of a detection signal of a rotation speed detection portion 99 (see FIG. 3) described later.

Figure 3:
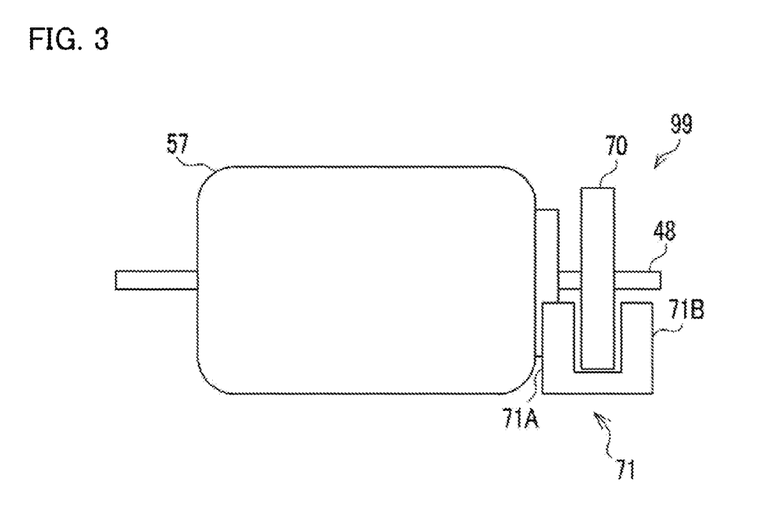
FIG. 3 is a diagram showing the configuration of a drive motor and a rotation speed detection portion.

The image forming apparatus 10 includes the rotation speed detection portion 99 which detects a rotation speed of the drive motor 57. The rotation speed detection portion 99 in the present embodiment is a rotary encoder.

As shown in FIG. 3, the rotary encoder includes a pulse plate 70 having a disc shape and a photointerrupter 71. The pulse plate 70 has a large number of slits (not shown) extending in a radial direction and formed so as to be arranged radially, for example, at intervals of a rotation angle of 1°. The pulse plate 70 is fixed to the motor output shaft 48 of the drive motor 57.

The photointerrupter 71 includes a light-emitting portion 71A and a light-receiving portion 71B which are opposed to each other at a certain interval. The pulse plate 70 passes through the gap between the light-emitting portion 71A and the light-receiving portion 71B. The signal level of a signal outputted from the light-receiving portion 71B is different between when light outputted from the light-emitting portion 71A passes through the slit and is received by the light-receiving portion 71B and when the light outputted from the light-emitting portion 71A is shielded by a portion of the pulse plate 70 other than the slits. When the pulse plate 70 rotates, a pulse signal is outputted from the light-receiving portion 71B to the control portion 90 (see FIGS. 1 and 2). In the case where a large number of slits (not shown) extending in the radial direction are formed so as to be arranged radially, for example, at intervals of a rotation angle of 1° as described above, the rotary encoder is able to detect the rotation speed of the pulse plate 70 with detection accuracy of a rotation angle of 1°.

As shown in FIG. 2, the sheet conveying device 100 includes a motor controller 58 and the conveying roller 150. The motor controller 58 is electrically connected to the drive motor 57 and the control portion 90. The motor controller 58 receives a speed command from the control portion 90 and controls a drive current to be supplied to the drive motor 57. The conveying roller 150 rotates by using the driving force, which is transmitted from the drive motor 57 controlled by the motor controller 58, to convey the sheet member P1.

The motor controller 58 includes an electronic circuit such as an integrated circuit (ASIC), and an internal memory, etc., and serves as a drive control portion 59. The motor controller 58 may be a microcomputer including a CPU, etc., similarly to the control portion 90.

The drive control portion 59 executes feedback control in which the above drive current is generated by a PWM method (pulse width modulation method), using a control signal inputted from the control portion 90 and the detection signal of the rotation speed detection portion 99, and is supplied to the drive motor 57. The control signal is a signal indicating a target rotation speed for the drive motor 57.

The drive control portion 59 includes a phase comparison portion 591, a PWM control portion 592, and a drive circuit portion 593. The phase comparison portion 591 performs, for example, known proportional-integral-derivative (PID) control on the basis of the phase difference between the control signal inputted from the control portion 90 and the detection signal of the rotation speed detection portion 99. Both the detection signal of the rotation speed detection portion 99 and the control signal inputted from the control portion 90 are pulse signals.

The PWM control portion 592 generates a PWM signal having a duty corresponding to a control variable obtained through the PID control performed by the phase comparison portion 591. The duty of the PWM signal generated by the PWM control portion 592 may be limited as described later.

The drive circuit portion 593 applies a voltage that is proportional to the duty of the PWM signal outputted from the PWM control portion 592, to the drive motor 57. By applying the voltage to the drive motor 57, the drive current is supplied to the drive motor 57.

Meanwhile, the control portion 90 is a microcomputer in which, for example, a CPU, a ROM, and a RAM, etc., are embedded in one integrated circuit. The CPU is a processor which executes various calculation processes. The ROM is a non-volatile storage portion in which information such as a control program for causing the CPU to execute various processes is stored in advance. The RAM is a volatile storage portion which is used as a primary storage memory (working area) for the various processes executed by the CPU. The control portion 90 centrally controls operation of the image forming apparatus 10 by the CPU executing programs stored in the ROM.

A processing program for causing the CPU of the control portion 90 to execute various processes is stored in the ROM of the control portion 90. The control portion 90 serves as a control signal output portion 902 and a stop processing portion 903 by executing the program with the CPU. In another embodiment, part or a plurality of functions of the control portion 90 may be provided as an electronic circuit.

The ROM of the control portion 90 includes a target rotation speed storage portion 901. A preset target rotation speed for the drive motor 57 is stored in advance in the target rotation speed storage portion 901. The control signal output portion 902 generates the control signal indicating the target rotation speed stored in the target rotation speed storage portion 901, and outputs the control signal to the motor controller 58.

Figure 4:
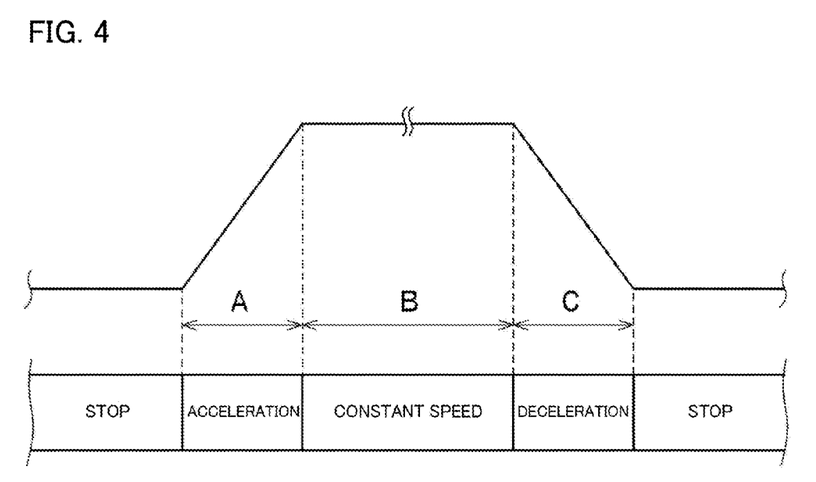
FIG. 4 is a graph showing change of a target rotation speed for the drive motor.

For example, as shown in FIG. 4, the control signal output portion 902 executes so-called trapezoidal control on the drive motor 57. In this case, a period in which the rotation speed of the drive motor 57 is controlled includes an acceleration control period A, a constant speed control period B, and a deceleration control period C. In the acceleration control period A, the control signal output portion 902 gradually increases the target rotation speed indicated by the control signal to be outputted to the motor controller 58, to a predetermined value. Accordingly, the conveying roller 150 accelerates to the target rotation speed at which the sheet member P1 is conveyed at a predetermined conveyance speed. In the constant speed control period B after the acceleration control period A, the control signal output portion 902 outputs the control signal indicating the constant target rotation speed, to the motor controller 58. Accordingly, the conveying roller 150 is maintained in a state where the conveying roller 150 conveys the sheet member P1 at the conveyance speed. Thereafter, in the deceleration control period C, the control signal output portion 902 gradually decreases the target rotation speed indicated by the control signal to be outputted to the motor controller 58, to zero. Accordingly, the conveying roller 150 decelerates from the target rotation speed and stops. Here, the acceleration control period A and the deceleration control period C are an example of a first control period in which the target rotation speed for the drive motor 57 is changed, and the constant speed control period B is an example of a second control period in which the target rotation speed is constant.

In the target rotation speed storage portion 901, the target rotation speed for the drive motor 57 in each of the periods A to C as described above is stored in advance. In each of the periods A to C, the control signal output portion 902 generates, as the control signal, a signal indicating the target rotation speed stored in the target rotation speed storage portion 901, and outputs the signal to the motor controller 58.

In the present embodiment, as described above, the control signal is a pulse signal. In addition, the magnitude of the target rotation speed corresponds to the cycle of the pulse signal. That is, the higher the target rotation speed is, the shorter the cycle of the pulse signal is (the higher the frequency thereof is). The duty of the pulse signal is a predetermined constant value regardless of the magnitude of the target rotation speed.

Upon reception of a later-described abnormality occurrence notification from the motor controller 58, the stop processing portion 903 executes, on the control signal output portion 902, a process for stopping the drive motor 57. For example, the stop processing portion 903 stops the drive motor 57 by stopping the generation of the control signal by the control signal output portion 902.

Incidentally, if a large load is applied to the drive motor 57, it is possible to maintain the speed of the conveying roller 150 constant by increasing the drive current supplied to the drive motor 57, in a range of up to a rated load current (a current limit at which a winding of the drive motor 57 is not burnt out) which is a maximum current that can be supplied to the drive motor 57. However, if the rated load current is continuously supplied to the drive motor 57, an amount of heat generated by the drive motor 57 considerably increases, so that the service life of the drive motor 57 may be shortened or breakage of the drive motor 57 may occur.

Thus, the drive current to be supplied to the drive motor 57 is conceived to be limited to not greater than a value that is lower than the rated load current. However, if the drive current is limited constantly in the period in which the drive motor 57 is controlled, a required torque is not obtained, for example, in the acceleration control period A in which a large torque is required for rotating the drive motor 57, so that a problem, such as lengthening of a time taken until the rotation speed of the drive motor 57 reaches a desired rotation speed, arises. On the other hand, as described later, the motor controller 58 according to the present embodiment executes a process for obtaining a necessary torque while suppressing generation of heat by the drive motor 57.

Specifically, as shown in FIG. 2, the drive control portion 59 of the motor controller 58 includes a period determination portion 594, an abnormality monitoring portion 595, and an abnormality notifying portion 596.

The period determination portion 594 determines which of the periods A to C the present period is, on the basis of the cycle of the pulse signal outputted from the control portion 90.

For example, the period determination portion 594 can perform the determination on the basis of the pulse signal of consecutive two cycles. Specifically, if the cycle of the immediately previous pulse signal is equal to the cycle of the pulse signal previous to the immediately previous pulse signal by one cycle or is a cycle within a predetermined error range with respect to the cycle of the pulse signal previous to the immediately previous pulse signal by one cycle, the period determination portion 594 determines that the present period is the constant speed control period B. In addition, if the cycle of the immediately previous pulse signal falls under the error range and is smaller than the cycle of the pulse signal previous to the immediately previous pulse signal by one cycle, the period determination portion 594 determines that the present period is the acceleration control period A. Moreover, if the cycle of the immediately previous pulse signal exceeds the error range and is larger than the cycle of the pulse signal previous to the immediately previous pulse signal by one cycle, the period determination portion 594 determines that the present period is the deceleration control period C. The period determination portion 594 performs such determination each time the pulse signal of one cycle is inputted from the control portion 90.

Here, in the present embodiment, the upper limit of the drive current is preset in accordance with each of the periods A to C. The PWM control portion 592 controls the drive current in a range of not greater than the upper limit corresponding to each of the periods A to C. In the present embodiment, the upper limit of the drive current is determined by the upper limit of the duty of the PWM signal.

Specifically, in the acceleration control period A, a large torque may be required, and a high drive current may be required. Thus, the upper limit of the drive current in the acceleration control period A is preset at a first upper limit which is equal to or less than the rated load current of the drive motor 57. That is, the PWM control portion 592 controls the drive current in the acceleration control period A such that the drive current is equal to or less than the rated load current.

Also in the deceleration control period C, a large torque may be required. Thus, in the present embodiment, the PWM control portion 592 controls the drive current in the deceleration control period C such that the drive current is equal to or less than the rated load current, similarly as in the acceleration control period A. In another embodiment, the upper limit of the drive current in the deceleration control period C may be set at a value equal to that in the constant speed control period B.

On the other hand, in the constant speed control period B, a large torque is often not required, but a large load may be intermittently applied to the drive motor 57. Thus, the upper limit of the drive current in the constant speed control period B is preset at a second upper limit which is less than the first upper limit. That is, the PWM control portion 592 controls the drive current in the constant speed control period B such that the drive current is equal to or less than the second upper limit.

In the constant speed control period B, if the drive current equal to or less than the second upper limit is supplied to the drive motor 57, the abnormality monitoring portion 595 monitors whether the rotation speed of the drive motor 57 detected by the rotation speed detection portion 99 has decreased to a preset allowable value or less. Specifically, since the drive current is restricted within the second upper limit, if a torque larger than a torque generated by the drive motor 57 with the drive current equal to or less than the second upper limit is required, the torque of the drive motor 57 becomes insufficient, so that the rotation speed of the drive motor 57 decreases. Thus, in the constant speed control period B, if the abnormality monitoring portion 595 detects that the rotation speed of the drive motor 57 has decreased to the allowable value or less, the abnormality monitoring portion 595 determines that an abnormality has occurred. The allowable value is a value obtained by subtracting a specific value from the target rotation speed or a value obtained by multiplying the target rotation speed by an allowance rate.

If the abnormality monitoring portion 595 determines that an abnormality has occurred, the abnormality notifying portion 596 outputs the abnormality occurrence notification indicating that the abnormality has occurred in the drive motor 57, to the control portion 90. Accordingly, the stop processing portion 903 of the control portion 90 stops transmission of the control signal to the motor controller 58.

If the abnormality monitoring portion 595 determines that an abnormality has occurred, the PWM control portion 592 stops supply of the drive current to the drive motor 57. For example, upon reception of a result of determination by the abnormality monitoring portion 595 that an abnormality has occurred, the abnormality notifying portion 596 outputs the abnormality occurrence notification to the control portion 90, and the stop processing portion 903 stops the transmission of the control signal from the control signal output portion 902 of the control portion 90 on the basis of the abnormality occurrence notification, whereby the PWM control portion 592 stops the supply of the drive current to the drive motor 57. Upon reception of an abnormality signal from the abnormality monitoring portion 595, the PWM control portion 592 may stop the supply of the drive current to the drive motor 57.

Figure 5:
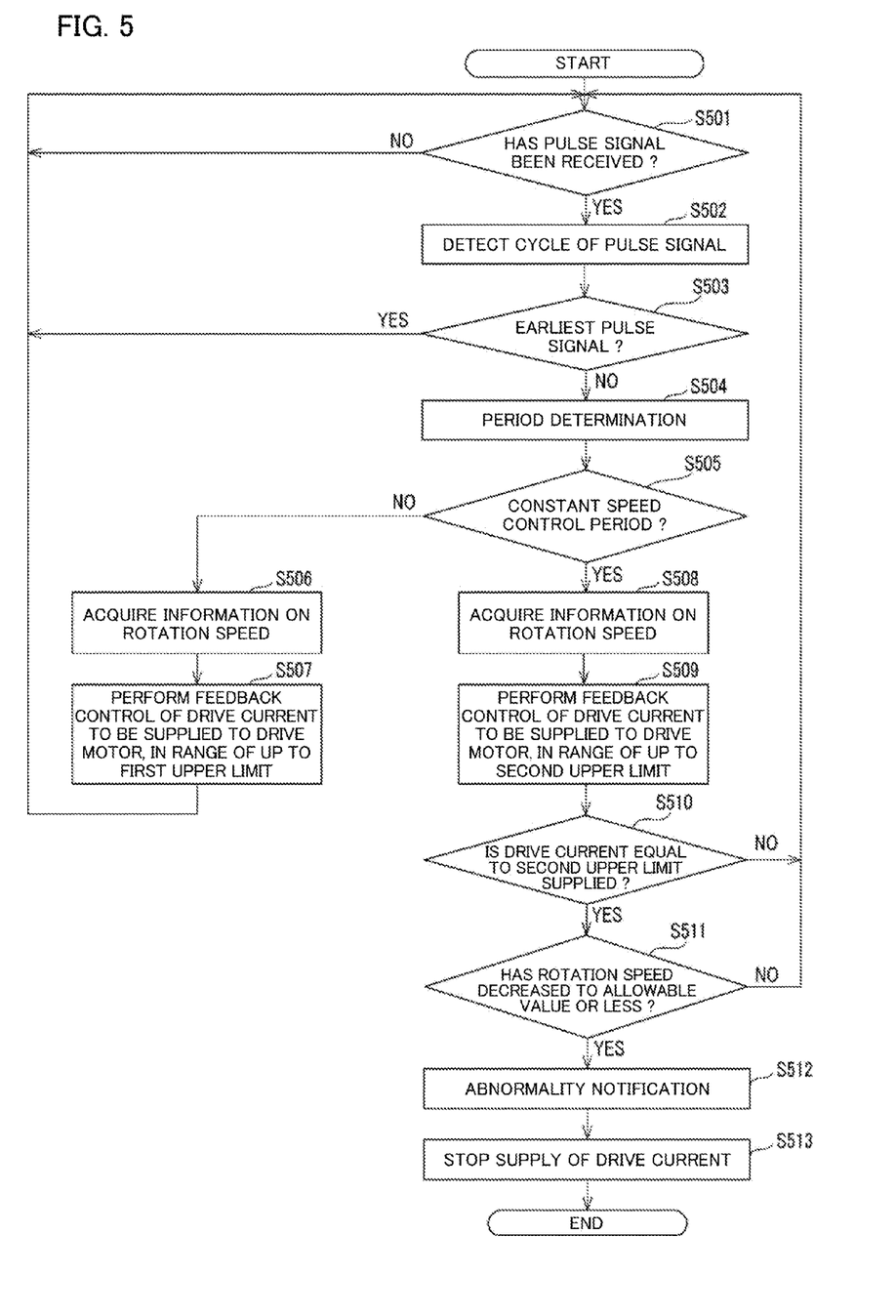
FIG. 5 is a flowchart showing a motor control process performed by a motor controller.

Next, a motor control process executed by the motor controller 58 will be described with reference to FIG. 5. For example, upon reception, from the control portion 90, of a drive start signal indicating that the conveying roller 150 is to be rotationally driven, the motor controller 58 executes the motor control process. In a flowchart of FIG. 5, S501, S502, . . . represent a process procedure (step numbers).

<Step S501>

In step S501, the period determination portion 594 determines whether the pulse signal (the control signal) has been received from the control portion 90. If the period determination portion 594 determines that the pulse signal has not been received from the control portion 90 (NO in step S501), the period determination portion 594 repeatedly performs the process in step S501 again. On the other hand, if the period determination portion 594 determines that the pulse signal has been received from the control portion 90 (YES in step S501), the period determination portion 594 shifts the process to step S502.

<Step S502>

In step S502, the period determination portion 594 detects the cycle of the pulse signal received from the control portion 90. In the present embodiment, the cycle of the pulse signal indicates the target rotation speed for the drive motor 57.

<Step S503>

In step S503, the period determination portion 594 determines whether the pulse signal received from the control portion 90 is the earliest pulse signal after start of control of the drive motor 57. For example, in step S503, it is determined whether the pulse signal received from the control portion 90 is the earliest pulse signal after the reception of the drive start signal. Here, if the period determination portion 594 determines that the pulse signal is the earliest pulse signal (YES in step S503), the period determination portion 594 performs the process in step S501 again. On the other hand, if the period determination portion 594 determines that the pulse signal is not the earliest pulse signal (NO in step S503), the period determination portion 594 shifts the process to step S504.

<Step S504>

In step S504, the period determination portion 594 compares the cycle of the pulse signal received presently from the control portion 90 with the cycle of the pulse signal previous thereto by one cycle, and determines a present control period. That is, the period determination portion 594 determines which of the acceleration control period A, the constant speed control period B, and the deceleration control period C the present control period is, by determining whether the cycle of the pulse signal received presently is equal to the cycle of the pulse signal previous thereto by one cycle or is a cycle within the predetermined error range with respect to the cycle of the pulse signal previous thereto by one cycle.

<Step S505>

If the period determination portion 594 determines that the present control period is the acceleration control period A or the deceleration control period C (NO in step S505), the period determination portion 594 shifts the process to step S506. If the period determination portion 594 determines that the present control period is the constant speed control period B (YES in step S505), the period determination portion 594 shifts the process to step S508.

<Step S506>

In step S506, the PWM control portion 592 acquires information on the rotation speed of the drive motor 57 from the rotation speed detection portion 99.

<Step S507>

In step S507, the PWM control portion 592 performs feedback control of the drive current to be supplied to the drive motor 57, on the basis of the rotation speed of the drive motor 57 acquired in step S506 and the target rotation speed indicated by the cycle of the pulse signal received from the control portion 90. At this time, since the present control period is the acceleration control period A or the deceleration control period C, the PWM control portion 592 supplies the drive current to be supplied to the drive motor 57, in a range of not greater than the first upper limit as described above. That is, the duty of the drive current to be supplied to the drive motor 57 is set in a range of not exceeding a duty corresponding to the first upper limit. Accordingly, even if a large load is applied to the drive motor 57, the drive current to be supplied to the drive motor 57 is restricted within the first upper limit.

<Step S508>

In step S508, the PWM control portion 592 acquires the information on the rotation speed of the drive motor 57 from the rotation speed detection portion 99.

<Step S509>

In step S509, the PWM control portion 592 performs feedback control of the drive current to be supplied to the drive motor 57, on the basis of the rotation speed of the drive motor 57 acquired in step S508 and the target rotation speed indicated by the cycle of the pulse signal received from the control portion 90. At this time, since the present control period is the constant speed control period B, the PWM control portion 592 supplies the drive current to be supplied to the drive motor 57, in a range of not greater than the second upper limit as described above. That is, the duty of the drive current to be supplied to the drive motor 57 is set in a range of not exceeding a duty corresponding to the second upper limit. Accordingly, even if a large load is applied to the drive motor 57, the drive current to be supplied to the drive motor 57 is restricted within the second upper limit.

<Step S510>

In step S510, the abnormality monitoring portion 595 determines whether the drive current to the drive motor 57 is equal to the second upper limit. If the abnormality monitoring portion 595 determines that the drive current to the drive motor 57 is not equal to the second upper limit (NO in step S510), the abnormality monitoring portion 595 returns the process to step S501. On the other hand, if the abnormality monitoring portion 595 determines that an abnormal state has occurred in which the drive current to the drive motor 57 is equal to the second upper limit (YES in step S510), the abnormality monitoring portion 595 shifts the process to step S511.

<Step S511>

In step S511, the abnormality monitoring portion 595 determines whether the rotation speed of the drive motor 57 detected by the rotation speed detection portion 99 has decreased to the allowable value or less. Here, if the abnormality monitoring portion 595 determines that the rotation speed has not decreased to the allowable value or less (NO in step S511), the drive control portion 59 returns the process to step S501. On the other hand, if the abnormality monitoring portion 595 determines that the rotation speed has decreased to the allowable value or less (YES in step S511), the abnormality monitoring portion 595 shifts the process to step S512.

<Step S512>

In step S512, the abnormality notifying portion 596 executes an abnormality notifying process of outputting the abnormality occurrence notification indicating that an abnormality has occurred in the drive motor 57, to the control portion 90. Accordingly, the stop processing portion 903 of the control portion 90 stops the transmission of the control signal to the motor controller 58. In addition, upon reception of the abnormality occurrence notification, the control portion 90 performs a stop process of, for example, stopping an image forming operation performed by the image forming apparatus 10.

<Step S513>

In step S513, the PWM control portion 592 stops the supply of the drive current to the drive motor 57 by the stop processing portion 903 of the control portion 90 stopping the transmission of the control signal to the motor controller 58. Accordingly, if an abnormal state has occurred in which the rotation speed of the drive motor 57 detected by the rotation speed detection portion 99 has decreased, driving of the drive motor 57 is stopped.

As described above, in the present embodiment, in the constant speed control period B, the drive current to be supplied to the drive motor 57 is controlled in the range of up to the second upper limit less than the first upper limit. Accordingly, even if a large load is applied to the drive motor 57, a high drive current with which an amount of heat generated by the drive motor 57 can considerably increase is not supplied to the drive motor 57. Thus, a situation where the service life of the drive motor 57 is shortened or breakage of the drive motor 57 occurs can be prevented from occurring.

In the acceleration control period A and the deceleration control period C, the drive current to be supplied to the drive motor 57 is controlled in the range of up to the first upper limit. Accordingly, particularly in the acceleration control period A in which a large torque is desired, a required torque can be generated.

That is, in the image forming apparatus 10, a necessary torque can be obtained while generation of heat by the drive motor 57 is suppressed.

In the image forming apparatus 10, an appropriate conveyance speed of the sheet member P1 may be different depending on, for example, the thickness or the material of the sheet member P1, printed image quality, or the like. In addition, the motor controller 58 may be able to control the drive motor 57 which is used for a plurality of types of conveying rollers 150 having different purposes or functions. In such a case, the target rotation speed for the drive motor 57 in the constant speed control period B is different depending on a parameter such as the thickness or the material of the sheet member P1, printed image quality, or the purpose of the conveying roller 150. Thus, the PWM control portion 592 may change the target rotation speed for the drive motor 57, the first upper limit, and the second upper limit in accordance with the parameter. The target rotation speed, the first upper limit, the second upper limit that correspond to each of the parameters are stored, for example, in a storage portion of the motor controller 58. In addition, the PWM control portion 592 may calculate the target rotation speed, the first upper limit, and the second upper limit that correspond to each of the parameters, on the basis of a predetermined calculation formula and the target rotation speed, the first upper limit, and the second upper limit that serve as references.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A sheet conveying device comprising a motor controller comprising a drive control portion configured to: execute feedback control of a drive current to be supplied to a drive motor, by using an inputted control signal indicating a target rotation speed for the drive motor and a detection signal of a rotation speed detection portion configured to detect a rotation speed of the drive motor; control the drive current in a first control period in which the target rotation speed is changed, such that the drive current is equal to or less than a predetermined first upper limit; and control the drive current in a second control period in which the target rotation speed is constant, such that the drive current is equal to or less than a predetermined second upper limit less than the first upper limit, wherein
   the drive control portion executes a notification so as to indicate that an abnormality has occurred in the drive motor, if the drive control portion detects that the rotation speed of the drive motor detected by the rotation speed detection portion has decreased in a state where the drive current equal to or less than the second upper limit is supplied to the drive motor in the second control period;
   a plurality of the second upper limits are set in accordance with the target rotation speed;
   the drive control portion restricts the drive current within the second upper limit corresponding to the target rotation speed in the second control period;
   the first upper limit is a value equal to or less than a rated load current of the drive motor;
   the sheet conveying device further comprises a conveying roller configured to rotate by using a driving force transmitted from the drive motor controlled by the motor controller, to convey a sheet member;
   the first control period includes an acceleration control period in which the target rotation speed is gradually increased to the constant speed of the second control period, and a deceleration control period in which the target rotation speed is gradually decreased from the constant speed of the second control period to zero;
   the drive control portion calculates the target rotation speed of the second control period on a basis of a predetermined parameter and a predetermined reference value pertaining to the sheet member or the conveying roller; and
   the drive control portion executes the notification and stops the supply of the drive current to the drive motor.

2. The sheet conveying device according to claim 1, wherein
   the control signal is a pulse signal having a cycle corresponding to the target rotation speed, and
   the drive control portion determines which of the first control period and the second control period a present period is, on the basis of the cycle of the pulse signal.

3. An image forming apparatus comprising:
   the sheet conveying device according to claim 1; and
   an image forming portion configured to form an image on the sheet member conveyed by the sheet conveying device.

* * * * *